(12) United States Patent
Tagami et al.

(10) Patent No.: US 7,773,476 B2
(45) Date of Patent: Aug. 10, 2010

(54) APPARATUS FOR REPRODUCING ENCODED DATA

(75) Inventors: Shinichiro Tagami, Setagaya-ku (JP); Takaaki Sawada, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1185 days.

(21) Appl. No.: 11/354,147

(22) Filed: Feb. 15, 2006

(65) Prior Publication Data

US 2006/0193598 A1  Aug. 31, 2006

(30) Foreign Application Priority Data

Feb. 24, 2005  (JP) .............................. 2005-049446

(51) Int. Cl.
*G11B 7/00* (2006.01)

(52) U.S. Cl. ................... 369/53.34; 369/53.31

(58) Field of Classification Search ............... 369/53.44
See application file for complete search history.

(56) References Cited

U.S. PATENT DOCUMENTS

| | | |
|---|---|---|
| 5,630,005 A | 5/1997 | Ort |
| 5,864,682 A | 1/1999 | Porter et al. |
| 6,453,073 B2 * | 9/2002 | Johnson ....................... 382/239 |
| 6,559,846 B1 * | 5/2003 | Uyttendaele et al. ........ 345/473 |
| 6,654,317 B2 * | 11/2003 | Tada et al. ............... 369/30.12 |
| 7,424,205 B2 * | 9/2008 | Kimura ........................ 386/95 |
| 2003/0228131 A1 * | 12/2003 | Miyazawa .................... 386/46 |

FOREIGN PATENT DOCUMENTS

| | | |
|---|---|---|
| JP | 2000-182326 | 6/2000 |
| JP | 2004-096474 | 3/2004 |
| JP | 2004-145929 | 5/2004 |
| JP | 2005-20339 | 1/2005 |

* cited by examiner

*Primary Examiner*—Lixi Chow
(74) *Attorney, Agent, or Firm*—Oblon, Spivak, McClelland, Maier & Neustadt, L.L.P.

(57) ABSTRACT

An aspect of the present invention provides an apparatus for reproducing encoded data that includes a data analyzer configured to analyze an encode method of the encoded data to reproduce, a controller configured to receive a seek command and a target time to seek, calculate a seek controlling bit rate according to a part of the encoded data, and compute, according to the calculated seek controlling bit rate, a data size corresponding to the target time to seek, and a decoder configured to skip the encoded data for the computed data size by the controller and decode, based on the analyzed encode method by the data analyzer, the encoded data after the end of the skipped part thereof.

17 Claims, 4 Drawing Sheets

APPARATUS FOR REPRODUCING ENCODED DATA

CROSS REFERENCE TO RELATED APPLICATIONS

This application is based upon and claims the benefit of priority from the prior Japanese Patent Application No. P2005-049446 filed on Feb. 24, 2005, the entire contents of which are incorporated herein by reference.

BACKGROUND OF THE INVENTION

1. Field of the Invention

The present invention relates to an apparatus for reproducing encoded data, and particularly, to a technique of speedily and accurately identifying a position to seek in encoded data and reducing an error from a desired time point from which the encoded data must be reproduced.

2. Description of Related Art

There are a variety of methods to encode data. To reproduce original data from encoded data, a reproducing apparatus employs an encoded data analyzer and a decoder. In the reproducing apparatus, a function of finding a required time point or position in encoded data and decode the data from the found time point or position is called a seek function. When a target time to seek in encoded data is specified, the reproducing apparatus computes a data size corresponding to the target time, skips the encoded data for the computed data size, reads the encoded data from a proper position around an end of the skipped data, and reproduces the read part of the encoded data.

Encoded data contained in an ASF file or an MP4 file has information concerning a relationship between time and position, and therefore, it is easy to correctly identify a time or position to seek in the encoded data. Any encoded data having no information about a time-position relationship also allows to determine a target time to seek in the encoded data if it keeps information about a bit rate. The bit rate information and the target time are sufficient to correctly compute a data size corresponding to the target time and identify the time to seek in the encoded data.

As the first related art, Japanese Laid-open Patent Publication No. 2000-182326 (in particular, FIG. 1 thereof) discloses a simultaneous recording/reproducing apparatus and a simultaneous multi-channel reproducing apparatus. This related art discloses a system controller 108 and a buffer memory 102. Detecting that an amount of data accumulated in the buffer memory 102 reaches a predetermined value, the system controller 108 suspends to read data from an optical disk 109 and continuously records the data in the buffer memory 102 to the optical disk 109. This related art also discloses a system controller 1408 that manages a zone of an optical disk 109 to which data is recorded and controls a motor 1412 to a rotation speed appropriate for the zone. This rotation speed is maintained for a reproducing operation.

As the second related art, Japanese Laid-open Patent Publication No. 2005-20339 (in particular, FIG. 1 thereof) discloses a technique of realizing a seek operation on multiplex data that has no frame information.

For the first related art, it is difficult to correctly determine a position to seek in encoded data if the encoded data contains no information about bit rate or relationship between time and position. To correctly determine a target position to seek in such encoded data, there is an idea to decode all frames and measure a reproducing time up to the target position. This idea involves an enormous amount of calculations, and therefore, is inapplicable to a system having limits on processing cost, performance, and computation resources.

On the other hand, the second related art involves a problem of long processing time because it computes an average time from a total data size and total reproduction time of given multiplex data.

SUMMARY OF THE INVENTION

An aspect of the present invention provides an apparatus for reproducing encoded data that includes a data analyzer configured to analyze an encode method of the encoded data to reproduce, a controller configured to receive a seek command and a target time to seek, calculate a seek controlling bit rate according to a part of the encoded data, and compute, according to the calculated seek controlling bit rate, a data size corresponding to the target time to seek, and a decoder configured to skip the encoded data for the computed data size by the controller and decode, based on the analyzed encode method by the data analyzer, the encoded data after the end of the skipped part thereof.

Another aspect of the present invention provides an apparatus for reproducing encoded data that includes a user application configured to send a seek command and a target time to seek in connection with the encoded data to reproduce, a data analyzer configured to analyze an encode method of the encoded data to reproduce, a controller configured to receive the seek command and the target time, calculate a seek controlling bit rate according to a part of the encoded data, and compute, according to the calculated seek controlling bit rate, a data size corresponding to the target time to seek, a decoder configured to skip the encoded data for the computed data size by the controller and decode, based on the analyzed encode method by the data analyzer, the encoded data after the end of the skipped part thereof, and an output unit configured to output decoded data by the decoder to a display device and a speaker connectable to the apparatus.

DETAILED DESCRIPTION OF EMBODIMENTS

Figure 1:
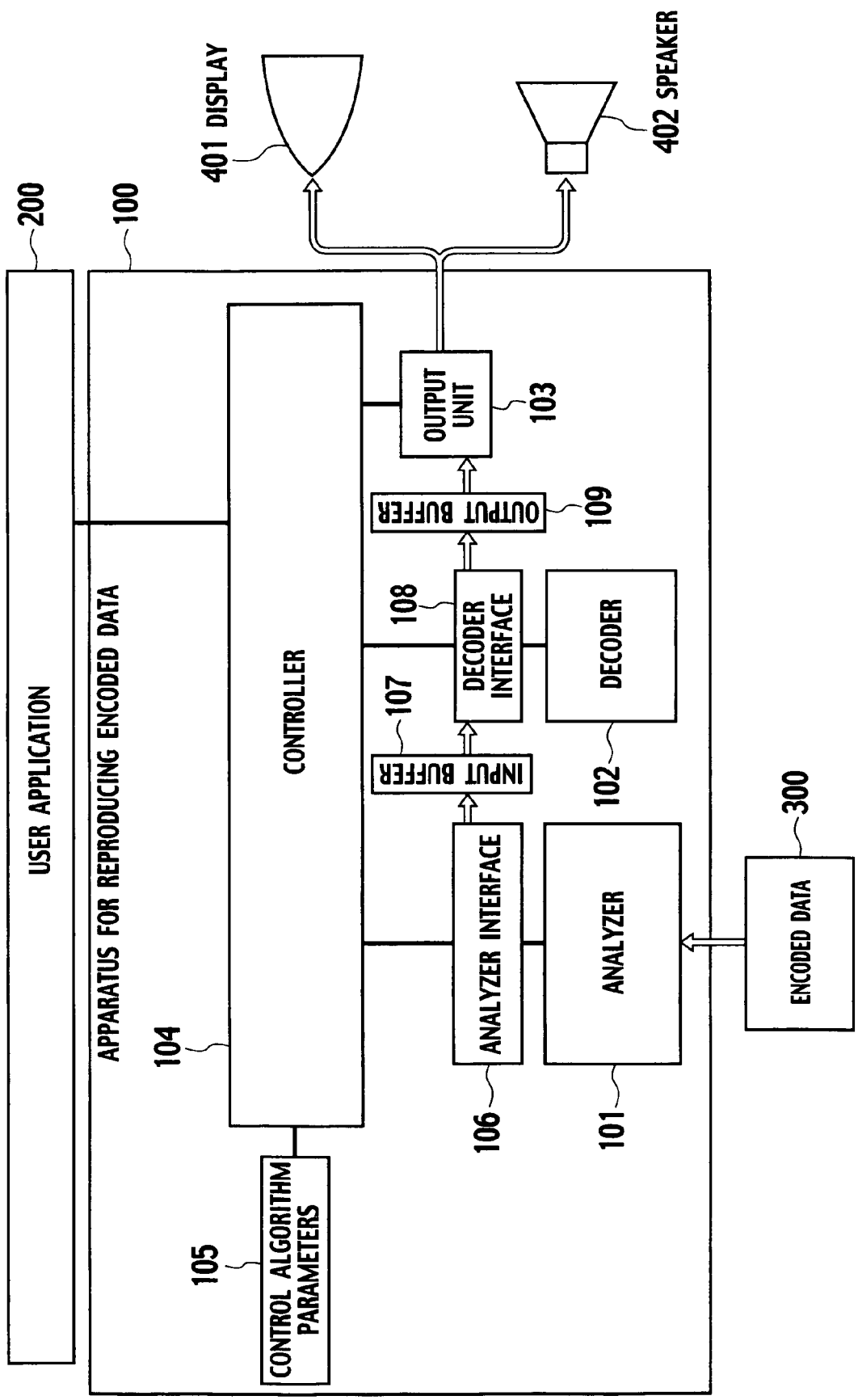
FIG. 1 is a block diagram showing an apparatus for reproducing encoded data according to a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

FIG. 1 is a block diagram showing an apparatus for reproducing encoded data according to a first embodiment of the present invention. The apparatus 100 has an analyzer 101 to analyze an encode method of encoded data 300 to be reproduced, a decoder 102 to decode the encoded data 300 according to the analyzed encode method, and a controller 104. The controller 104 receives a seek command and a target time (or position) to seek from a user application 200, computes a seek controlling bit rate according to a part of the encoded data 300, and calculates a data size corresponding to the target time according to the received target time and computed bit rate. The decoder 102 skips the encoded data 300 for the computed data size and decodes the encoded data 300 from a position at the end of the skipped data.

The apparatus 100 also has an output unit 103 that outputs the decoded data to a display 401 and a speaker 402. The controller 104 generally manages the apparatus 100 and receives commands from the user application 200.

Control algorithm parameters 105 determine a control algorithm of the controller 104. The control algorithm parameters 105 include information for identifying a file format, information for identifying an encode method, and attributes of the encoded data 300 such as a bit rate and an image size. Encoded data to be input to the apparatus 100 may have a variety of encode methods and file formats. To cope with them, the analyzer 101 and decoder 102 may be replaced with other ones that match the encode method and file format of encoded data to be input. To enable such a replacement, the apparatus 100 has an analyzer interface 106 and a decoder interface 108. With these interfaces 106 and 108, the user application 200 can always use the apparatus 100 even if the analyzer 101 and decoder 102 are replaced with other ones. Between the analyzer interface 106 and the decoder interface 108, an input buffer 107 may be arranged. Between the decoder interface 108 and the output unit 103, an output buffer 109 may be arranged.

Figure 2:
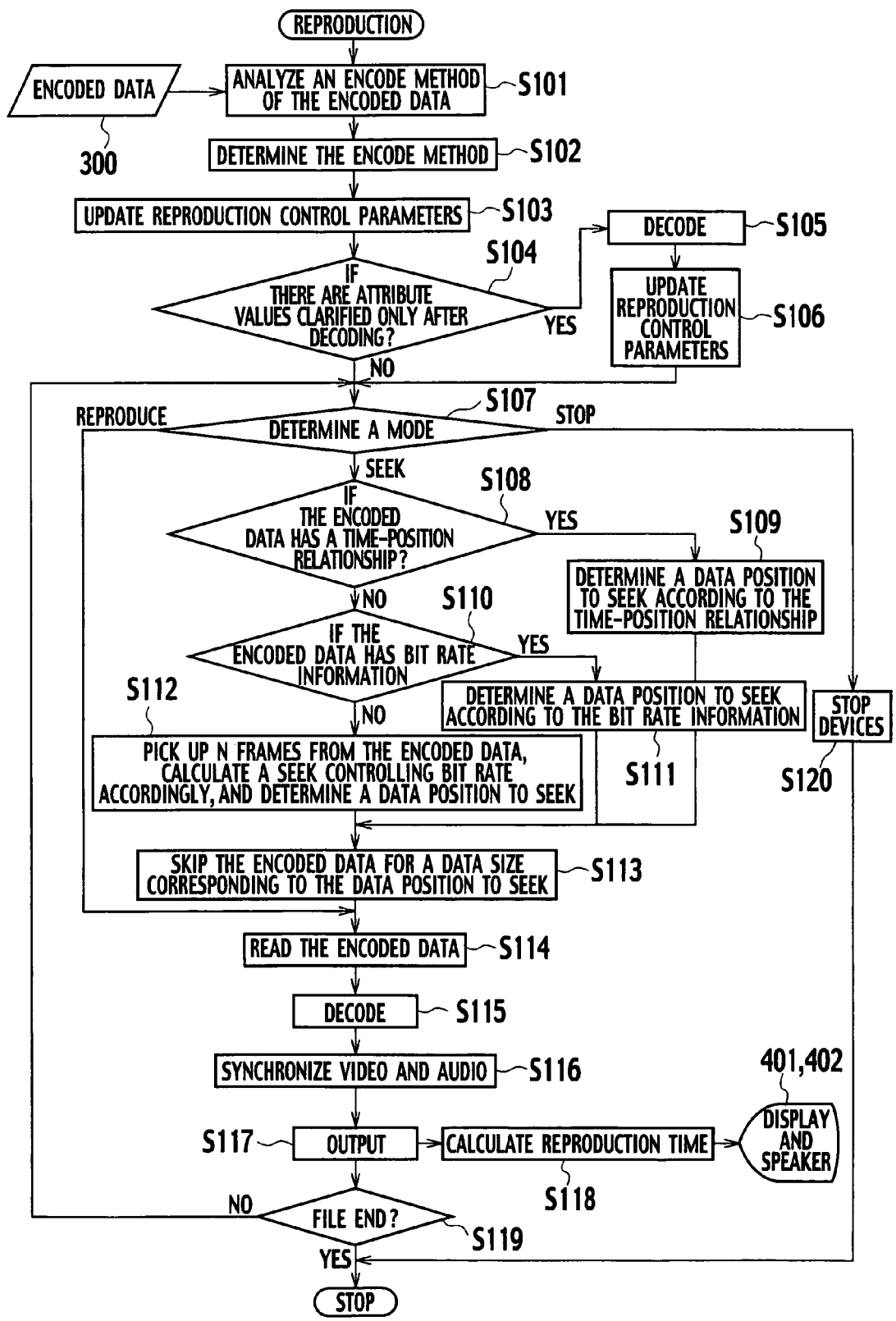
FIG. 2 is a flowchart showing operation of the apparatus 100 for reproducing encoded data according to the first embodiment of the present invention.

FIG. 2 is a flowchart showing operation of the apparatus 100 for reproducing encoded data according to the first embodiment of the present invention. The user application 200 provides the apparatus 100 with a reproduce command. In step S101, the controller 104 instructs the analyzer 101 to read the encoded data 300 and analyze an encode method of the encoded data 300. In step S102, the analyzer 101 identifies the encode method. In step S103, the analyzer 101 updates the control algorithm parameters 105 according to the identified encode method. Step S104 checks to see if the encoded data 300 has attribute values that will be known only after decoding, such as a down mix parameter of AAC (advanced audio coding). If there are such attribute values, step S105 decodes the encoded data 300 and clarifies the attribute values, and step S106 updates the control algorithm parameters 105 accordingly.

Step S107 determines a mode according to the reproduction command from the user application 200. If the mode is a reproduction mode, step S114 partly or entirely transfers the encoded data 300 to the input buffer 107, so that the decoder 102 may read the encoded data 300 from the input buffer 107 through the decoder interface 108. In step S115, the decoder 102 decodes the read encoded data 300 into output data according to the determined encode method and transfers the output data through the decoder interface 108 to the output buffer 109. In step S116, the controller 104 obtains the output data from the output buffer 109, synchronizes video data and audio data in the output data with each other, and transfers the synchronized data to the output unit 103. In step S117, the output unit 103 outputs the video and audio data to the display 401 and speaker 402. Step S119 checks to see if the encoded data 300 has been read to the end thereof. If the encoded data 300 has not entirely been read, the flow returns to step S107. If the encoded data 300 has entirely been read, the process ends in step S120.

Step S118 measures an amount of data output from the output unit 103 and calculates a reproduction time of the encoded data 300. The calculated reproduction time is used by the user application 200.

If step S107 determines that it is a stop mode, the controller 104 issues, in step S120, a stop instruction to the analyzer 101, the decoder 102, and the output unit 103. On receiving the stop instruction, the analyzer 101, the decoder 102 and the output unit 103 stop to operate.

If step S107 determines that it is a seek mode, the controller 104 identifies a target position or time to seek in the encoded data 300, seeks the identified target position, and reproduces the encoded data 300 from the sought position. The user application 200 provides the controller 104 with a seek instruction including a target time (or position) to seek. According to the target time, the controller 104 calculates a data size corresponding to the target time and sends the calculated data size to the analyzer 101. The analyzer 101 skips the encoded data 300 for the data size and reads the encoded data 300 from an adequate position at the end of the skipped data.

Step S108 checks to see if the encoded data 300 has information concerning a relationship between time and position. If the encoded data 300 has such information, step S109 determines a target position to seek in the encoded data 300 according to the target time and the time-position relationship and calculates a data size to skip. Step S113 skips the encoded data 300 for the calculated data size. Thereafter, the steps following step S113 are carried out to reproduce the encoded data 300 from the end of the skipped data. If step S108 determines that the encoded data 300 has no information about the time-position relationship, step S110 checks to see if the encoded data 300 has information for a bit rate. If the encoded data 300 has the bit rate information, step Sill determines a target position to seek in the encoded data 300 according to the bit rate information and calculates a data size to skip. Step S113 skips the encoded data 300 for the calculated data size. Thereafter, the steps following step S113 are carried out to reproduce the encoded data 300 from the end of the skipped data.

In this way, if the encoded data 300 is of an MP4 file or of an ASF (advanced streaming format) file having information about a relationship between time and position, the apparatus 100 can quickly determine a data position to seek in the encoded data 300. If the encoded data 300 is CBR (constant bit rate) data having information about a bit rate, the apparatus 100 can correctly calculate a data size to skip by multiplying the target time to seek by the bit rate.

If the encoded data 300 has no information for a time-position relationship or information about a bit rate, it is difficult to determine a target position to seek and it is sometimes unable to reproduce the encoded data 300 from the target position. If the encoded data 300 has no information about a time-position relationship in step S108 of FIG. 2 and if the encoded data 300 has no information about a bit rate in step S110, step S112 calculates a seek controlling bit rate from N frames of the encoded data 300, determines a position to seek, and computes a data size to skip. Step S113 skips the encoded data 300 for the computed data size. Thereafter, the steps following step S113 are carried out to reproduce the encoded data 300 from the end of the skipped data.

Figure 3:
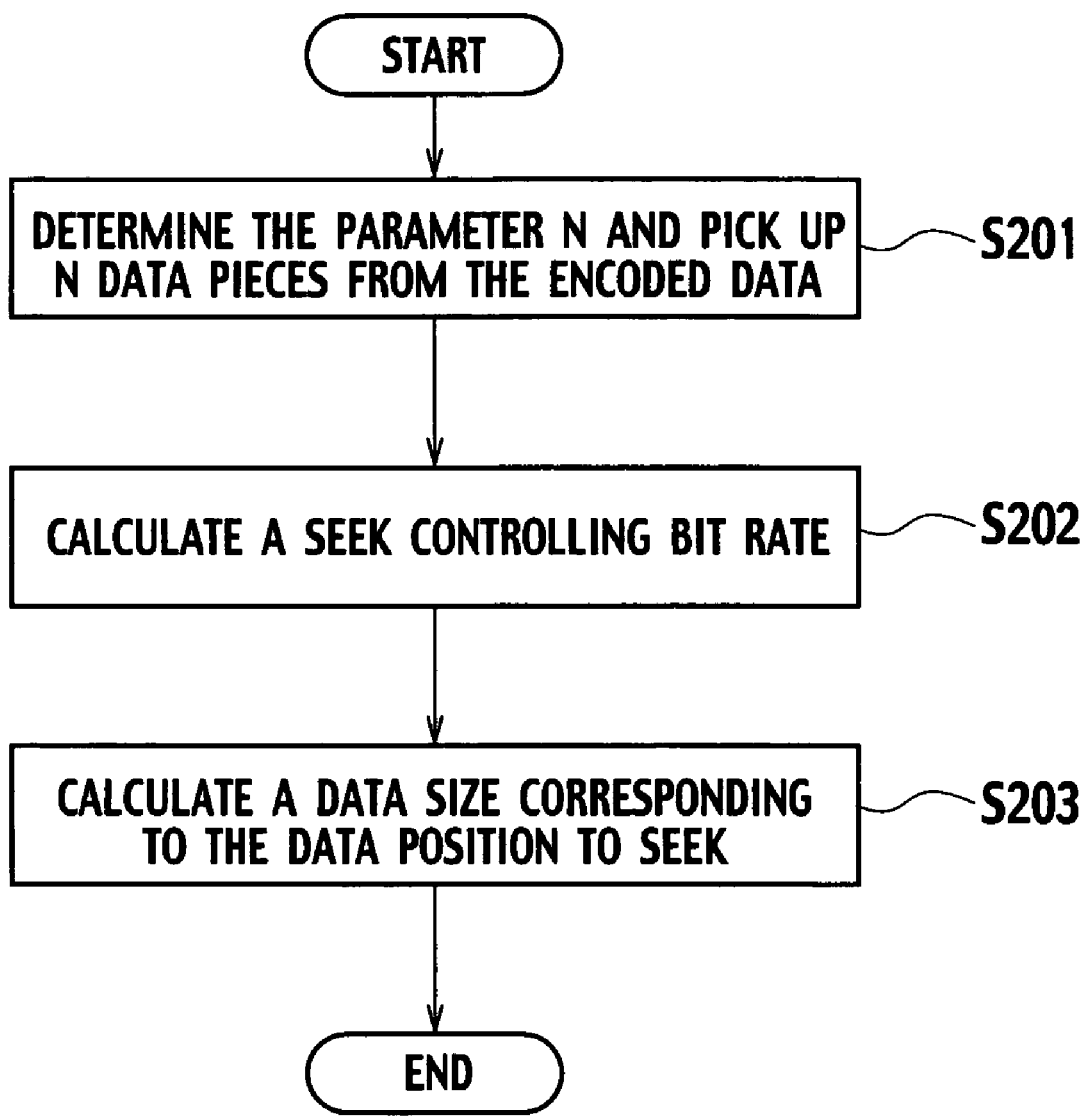
FIG. 3 is a flowchart showing the details of step S112 according to the first embodiment.

FIG. 3 is a flowchart showing the details of step S112 according to the first embodiment. Step S201 determines a parameter N, which is the number of sample data to be picked up from the encoded data 300. The N sample data (frames in the embodiment) may be picked up from a middle part of the encoded data 300. This is because, in standard video and audio encoded data, start and end parts are frequently margins containing black images and no sound. In such parts, a bit rate is extremely low. In another embodiment, the N frames may be randomly extracted from the encoded data 300.

If the bit rate of a picked-up frame is quite different from those of the other frames, the picked-up frame may be excluded when calculating a seek controlling bit rate. This improves the accuracy of the calculated seek controlling bit rate.

The number N may be changed depending on the type of the encoded data 300. For example, if the encoded data 300 is large in size, the number N may be increased because a large bit-rate fluctuation is expected in the large encoded data 300. If the encoded data 300 is small in size, the number N may be decreased because a small bit-rate fluctuation is expected in the small encoded data 300. If the genre of the encoded data 300 is known, for example, if the encoded data 300 is a movie, the number N may be small because movies usually involve a small bit-rate fluctuation. If the encoded data 300 is classical music, the number N may be large because the classical music usually involves a wide dynamic range and a large bit-rate fluctuation. If the encoded data 300 is pop music, the number N may be small because the pop music involves a narrow dynamic range and a small bit-rate fluctuation.

According to the number N thus determined, N frames are picked up from the encoded data 300 and the bit rate of the N frames is analyzed. The analyzed bit rate is temporarily stored.

Step S202 calculates a seek controlling bit rate as follows:

$$\text{Seek controlling bit rate} = (\text{total of } N \text{ bit rates of } N \text{ frames})/N \quad (1)$$

where N is a positive integer. Namely, the seek controlling bit rate is calculated by totaling the N bit rate values of the N frames temporarily stored and by dividing the total by N. The calculated seek controlling bit rate is temporarily stored.

Step S203 calculates a data size corresponding to the target time to seek as follows:

$$\text{Data size} = (\text{target time to seek}) \times (\text{seek controlling bit rate}) \quad (2)$$

Namely, the data size is calculated by multiplying the target time to seek received from the user application 200 by the calculated seek controlling bit rate.

According to the data size, a proper position to seek is determined, and the encoded data 300 is reproduced from the proper position.

As mentioned above, the analyzer 101 and decoder 102 may be replaced with other ones depending on the encode method or file format of given encoded data, to flexibly cope with a variety of encode methods and file formats. Even if the analyzer 101 and decoder 102 are replaced with other ones, no change will be required for the user application 200 in using the apparatus 100 because of the presence of the analyzer interface 106 and decoder interface 108 in the apparatus 100. If given encoded data has no information about a relationship between time and position or information about a bit rate, the apparatus 100 according to the first embodiment calculates a bit rate without entirely decoding the encoded data, i.e., with a small number of calculations. Based on the calculated bit rate, the first embodiment calculates a data size corresponding to a target time to seek, and based on the calculated data size, accurately determines a position to seek in the given encoded data. The first embodiment is effective to encoded data of constant bit rate (CBR) and of variable bit rate (VBR).

The first embodiment picks up N frames from encoded data, and according to the N frames, calculates a seek controlling bit rate. This does not limit the present invention. If the encoded data is of MPEG-1, N packs or packets may be taken from the encoded data, to calculate a seek controlling bit rate. If the encoded data is of MPEG-2, N PS packs, PESs (packetized elementary streams), TS packets, or sections may be taken from the encoded data, to calculate a seek controlling bit rate. If the encoded data is MPEG video data, N sequences, GOPs (groups of pictures), pictures, slices, macro-blocks, or blocks may be extracted from the encoded data, to calculate a seek controlling bit rate.

Figure 4:
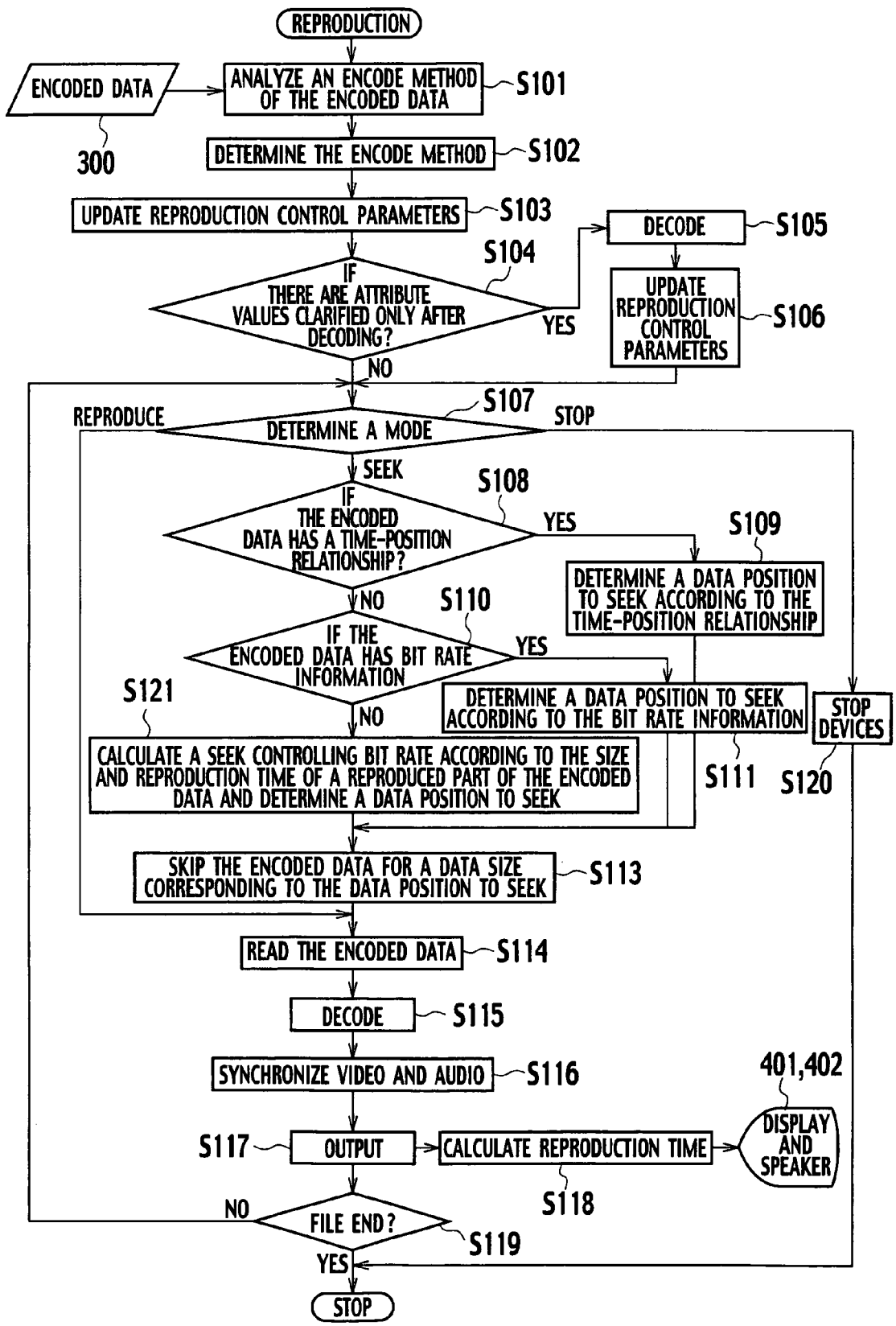
FIG. 4 is a flowchart showing operation of the apparatus according to the second embodiment.

An apparatus for reproducing encoded data according to a second embodiment of the present invention will be explained. FIG. 4 is a flowchart showing operation of the apparatus according to the second embodiment. A difference of the second embodiment from the first embodiment is only step S121 of FIG. 4. The other steps of the second embodiment are basically the same as those of the first embodiment, and therefore, the explanations of the same steps are omitted.

In FIG. 4, step S121 finds the size of a reproduced part of encoded data and a reproduction time of the reproduced part, calculates a seek controlling bit rate according to the found size and time, and determines a target position to seek in the encoded data. This embodiment is effective when the encoded data has no information concerning a relationship between time and position or information about a bit rate and when no frame is obtainable from the encoded data in advance. In this case, the second embodiment reproduces the encoded data, temporarily stores a size of the reproduced part of the encoded data and a reproduction time of the reproduced part, and calculates a seek controlling bit rate according to the temporarily stored data. When determining a target position to seek, the second embodiment multiplies a target time to seek by the seek controlling bit rate and correctly identifies the position to seek in the encoded data.

Any reproduced part of encoded data has been already analyzed by the analyzer 101, and therefore, can provide information about a bit rate of frames contained therein. According to the bit rate information, the second embodiment can speedily calculate a seek controlling bit rate. In this way, the second embodiment employs a reproduced part of encoded data, to calculate a seek controlling bit rate at high speed.

A seek instruction may be issued just after the start of reproduction of encoded data. In this case, a reproduction time is too short to correctly determine a target position to seek. To cope with this, the second embodiment may obtain information from the reproduced part of the encoded data, as well as from the remaining part of the encoded data by partly pre-reading the remaining part. Thereafter, the second embodiment may calculates a seek controlling bit rate according to the sample data in the reproduced part of the encoded data and the pre-reading part of the encoded data.

An apparatus for reproducing encoded data according to a third embodiment of the present invention will be explained. Like the first embodiment, the third embodiment determines a parameter N and picks up N data pieces from given encoded data. At this time, the third embodiment picks up N data pieces from an already reproduced part of the encoded data. By doing so, the third embodiment can realize the effects of both the first and second embodiments.

If given encoded data has no information about a relationship between time and position or information about a bit rate and if no frame is obtainable from the encoded data in advance, the third embodiment may pick up N data pieces from a reproduced part of the encoded data and may carry out the technique of the first embodiment on the picked-up N data pieces.

The third embodiment is capable of calculating a seek controlling bit rate for streaming-type encoded data whose overall picture is ungraspable in advance or for encoded data from which N frames are not extractable due to various limitations including limitation of hardware and network band. Based on the calculated seek controlling bit rate, the third embodiment can correctly determine a target position to seek in the encoded data. In this way, the third embodiment achieves the effects of both the first and second embodiments. The apparatus for reproducing encoded data according to the first and second embodiment can apply to various media distribution such as home network and the Internet.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. An apparatus for reproducing encoded data, comprising:
    a data analyzer configured to analyze an encode method of the encoded data to be reproduced;
        a controller configured to receive a seek command and a target time to seek, to calculate a seek controlling bit rate according to a part of the encoded data, and to compute, according to the calculated seek controlling bit rate, a data size corresponding to the target time to seek; and
    a decoder configured to skip the encoded data for the computed data size by the controller and decode, based on the analyzed encode method by the data analyzer, the encoded data after the end of the skipped part thereof, wherein
    the controller determines a number of sample data to be extracted from the encoded data, extracts the determined number of the sample data from the encoded data, calculates the seek controlling bit rate according to the extracted sample data, and computes the skipping data size according to the calculated seek controlling bit rate and the received target time, and
    the controller finds a genre of the encoded data, and according to the found genre, determines the number of the sample data to be extracted from the encoded data.

2. The apparatus of claim 1, wherein:
    the controller extracts the determined number of sample data from a middle part of the encoded data.

3. The apparatus of claim 1, wherein:
    the controller determines the number of sample data according to the size of the encoded data.

4. The apparatus of claim 1, wherein:
    the controller determines a number of frames as the number of the sample data to be extracted from the encoded data.

5. The apparatus of claim 1, wherein:
    the controller excludes a sample data from the sample data extracted for calculating the seek controlling bit rate, if the bit rate of the sample data to be extracted is substantially different from bit rates of other frames.

6. The apparatus of claim 1, wherein:
    the controller calculates the seek controlling bit rate according to an already reproduced part of the encoded data and computes the skipping data size according to the calculated seek controlling bit rate and the received target time.

7. The apparatus of claim 6, wherein:
    the controller calculates the seek controlling bit rate according to a part of the encoded data already analyzed by the analyzer and computes the skipping data size according to the calculated seek controlling bit rate and the received target time.

8. The apparatus of claim 6, wherein:
    the controller picks up the sample data from a part of the already reproduced part of the encoded data, as well as a part of the remaining unreproduced part of the encoded data.

9. The apparatus of claim 6, wherein:
    the controller determines the number of sample data according to the size of the encoded data.

10. The apparatus of claim 9, wherein:
    the controller determines the number of frames as the number of the sample data to be extracted from the encoded data.

11. The apparatus of claim 6, wherein:
    the controller finds a genre of the encoded data, and according to the found genre, determines the number of the sample data to be extracted from the encoded data.

12. The apparatus of claim 11, wherein:
    if the encoded data has no information about a relationship between time and position of the encoded data, the controller checks to see if the encoded data has information about a bit rate, and if the encoded data has the bit rate information, computes the skipping data size according to the bit rate information.

13. The apparatus of claim 1, wherein:
    the controller checks to see if the encoded data has information regarding a relationship between time and position of the encoded data, and if the encoded data has the information regarding a relationship between time and position of the encoded data, the controller computes the skipping data size according to the calculated seek controlling bit rate and the information regarding the relationship between time and position.

14. An apparatus for reproducing encoded data, comprising:
    a data analyzer configured to analyze an encode method of the encoded data to be reproduced;
    a controller configured to receive a seek command and a target time to seek, to calculate a seek controlling bit rate according to a part of the encoded data, and to compute, according to the calculated seek controlling bit rate, a data size corresponding to the target time to seek;
    a decoder configured to skip the encoded data for the computed data size by the controller and decode, based on the analyzed encode method by the data analyzer, the encoded data after the end of the skipped part thereof; and
    a parameter holder configured to hold control algorithm parameters for the encoded data, the analyzer analyzing the encode method of the encoded data to be reproduced, the parameter holder holding the analyzed encode method, wherein
    if the encoded data includes a parameter that can be clarified after decoding the encoded data, the decoder decodes the encoded data, and the parameter holder holds the parameter clarified after the decoding of the encoded data.

15. An apparatus for reproducing encoded data, comprising:
    a user application configured to send a seek command and a target time to seek in connection with the encoded data to be reproduced;
    a data analyzer configured to analyze an encode method of the encoded data to reproduce;

a controller configured to receive the seek command and the target time, to calculate a seek controlling bit rate according to a part of the encoded data, and to compute, according to the calculated seek controlling bit rate, a data size corresponding to the target time to seek;

a decoder configured to skip the encoded data for the computed data size by the controller and decode, based on the analyzed encode method by the data analyzer, the encoded data after the end of the skipped part thereof; and an output unit configured to output decoded data by the decoder to a display device and a speaker connectable to the apparatus, wherein the controller determines a number of sample data to be extracted from the encoded data, extracts the determined number of the sample data from the encoded data, calculates the seek controlling bit rate according to the extracted sample data, and computes the skipping data size according to the calculated seek controlling bit rate and the received target time, and the controller finds a genre of the encoded data, and according to the found genre, determines the number of the sample data to be extracted from the encoded data.

16. The apparatus of claim 15, wherein:

the controller determines the number of sample data to be extracted from the encoded data, extracts the determined number of the sample data from the encoded data, calculates the seek controlling bit rate according to the extracted sample data, and computes the skipping data size according to the calculated seek controlling bit rate and the received target time.

17. The apparatus of claim 16, wherein:

the controller extracts the determined number of sample data from a middle part of the encoded data.

* * * * *